No. 612,817. Patented Oct. 25, 1898.
F. G. M. BRITTIN & B. W. GLASS.
APPARATUS FOR FREEZING MEATS.
(Application filed Dec. 29, 1896.)
(No Model.)
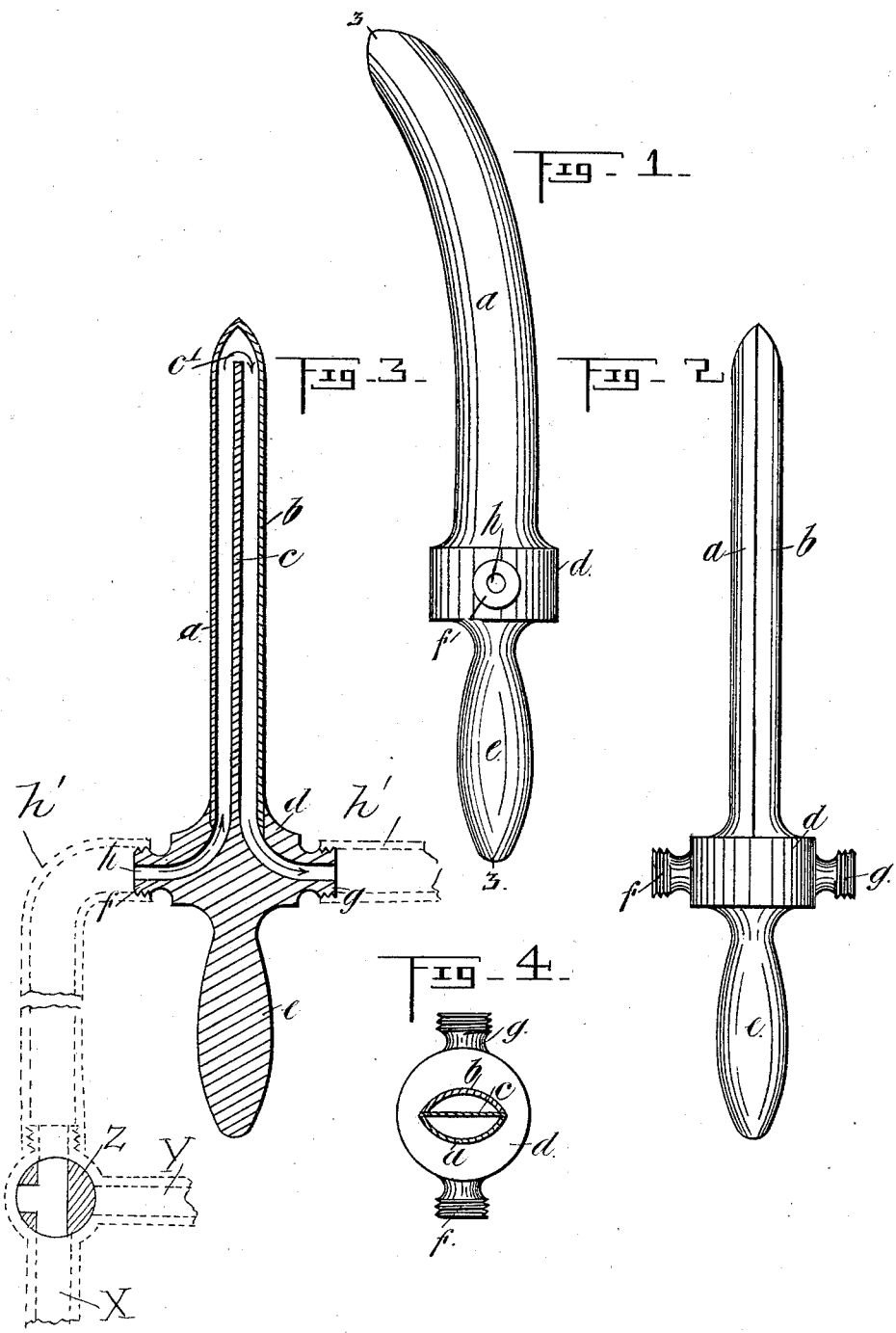

UNITED STATES PATENT OFFICE.

FREDERICK G. M. BRITTIN AND BENJAMIN W. GLASS, OF CHRISTCHURCH, NEW ZEALAND.

APPARATUS FOR FREEZING MEATS.

SPECIFICATION forming part of Letters Patent No. 612,817, dated October 25, 1898.

Application filed December 29, 1896. Serial No. 617,322. (No model.) Patented in New Zealand November 24, 1896, No. 9,071; in New South Wales December 3, 1896, No. 7,101; in Victoria December 4, 1896, No. 13,765; in Queensland December 5, 1896, No. 3,656; in South Australia December 11, 1896, No. 3,492; in West Australia December 17, 1896, No. 1,429; in England January 1, 1897, No. 62; in Germany January 8, 1897, No. 93,227; in France January 11, 1897, No. 262,967, and in Cape Colony February 5, 1897, No. 1,287.

*To all whom it may concern:*

Be it known that we, FREDERICK GEORGE MORRIS BRITTIN, surgeon, and BENJAMIN WALTER GLASS, engineer, subjects of the Queen of Great Britain, residing at 71 Cathedral Square, Christchurch, in the Provincial District of Canterbury, in the Colony of New Zealand, have invented an Improved Method of and Apparatus for Freezing Meats, of which the following is a specification.

Patents have been granted for this invention in the following countries: New Zealand, No. 9,071, dated November 24, 1896; New South Wales, No. 7,101, dated December 3, 1896; Victoria, No. 13,765, dated December 4, 1896; South Australia, No. 3,492, dated December 11, 1896; West Australia, No. 1,429, dated December 17, 1896; Queensland, No. 3,656, dated December 5, 1896; Cape Colony, No. 1,287, dated February 5, 1897; France, No. 262,967, dated January 11, 1897; Great Britain, No. 62, dated January 1, 1897, and Germany, No. 93,227, dated January 8, 1897.

Meat frozen by the ordinary process in a refrigerating-chamber is liable to "bone taint" through the frost failing to completely penetrate the thickest parts of the joint.

According to our invention any useful freezing medium—such as brine, carbonic acid, or ammonia—is caused to circulate through a tubular knife or stiletto, which is forced into the carcass or joint preferably alongside or into the largest bone.

Referring to the accompanying drawings, Figure 1 is a side and Fig. 2 an end elevation, Fig. 3 a section, and Fig. 4 a sectional plan, illustrating our invention.

Similar letters of reference indicate the same parts in all the figures.

The knife is made by brazing together the edges of two strips of steel $a\ b$, which are respectively bent into a concave shape, a plate $c$, secured between them, dividing the blade longitudinally, except at the point where an opening $c'$ is provided to allow the freezing medium to pass from one side to the other.

The blade is fixed into a socket $d$, having a handle $e$, screwed union-couplings $f\ g$ upon the socket permitting hose, as $h'$, to be coupled for supplying and returning the freezing medium. An ordinary three-way cock Z, placed in any convenient position between the source of supply X of the freezing medium and the portway $h$ in the union-coupling $f$, permits the freezing medium to be cut off from and liquid at a higher temperature admitted to the knife through pipe X, for a purpose to be described.

When treating a quarter of beef, the blade is preferably passed into the obturator foramen, and the blade is made curved, as illustrated, in order that it may, as nearly as convenient, coincide with the shape of the bone.

When the knife is inserted into the meat, it is well to employ it as nearly as possible parallel with the fibers of the joint, as the juices are then better retained when the meat is cooked.

In operation the knife is forced into the joint and the three-way cock referred to adjusted to supply the refrigerating medium, which passes into the blade and up one and down the other side of the partition $c$, returning to the circulating tank or pump through hose attached to the screwed coupling $g$. When the meat is sufficiently frozen, the three-way cock is turned to admit liquid of a higher temperature in place of the freezing medium, so that the meat immediately in contact with the blade is momentarily thawed to enable the knife to be withdrawn.

Our invention is principally for use in connection with an ordinary freezing-chamber, the meat being frozen from the surface and the inside either separately or simultaneously; but it is also valuable for chilling meat to prevent decomposition when a freezing-chamber is not available.

Having now particularly described and ascertained the nature of our said invention and in what manner the same is to be performed, we declare that what we claim is—

1. The knife for freezing meat consisting of the hollow blade having the inlet and outlet channels with connections for introducing a freezing liquid or a thawing liquid and means for controlling the admission of said liquids, substantially as described.

2. The knife for freezing meats consisting of the two concave pieces brazed together and with the intermediate partition, said brazed parts being fixed to a socket having ports extending through it, substantially as described.

Dated this 19th day of November, 1896.

F. G. M. BRITTIN.
B. W. GLASS.

Witnesses:
HENRIE H. RAYWARD,
W. CUMING.